(12) United States Patent
Guo et al.

(10) Patent No.: US 12,045,578 B2
(45) Date of Patent: Jul. 23, 2024

(54) METHOD FOR DETERMINING TEXT SIMILARITY, STORAGE MEDIUM AND ELECTRONIC DEVICE

(71) Applicants: BEIJING XIAOMI MOBILE SOFTWARE CO., LTD., Beijing (CN); BEIJING XIAOMI PINECONE ELECTRONICS CO., LTD., Beijing (CN)

(72) Inventors: Yuankai Guo, Beijing (CN); Bin Wang, Beijing (CN); Erli Meng, Beijing (CN); Liang Shi, Beijing (CN)

(73) Assignees: BEIJING XIAOMI MOBILE SOFTWARE CO., LTD., Beijing (CN); BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 421 days.

(21) Appl. No.: 17/443,608

(22) Filed: Jul. 27, 2021

(65) Prior Publication Data
US 2022/0292265 A1   Sep. 15, 2022

(30) Foreign Application Priority Data
Mar. 9, 2021   (CN) .......................... 202110258338.7

(51) Int. Cl.
*G06F 40/40*   (2020.01)
*G06F 40/20*   (2020.01)
*G06F 40/30*   (2020.01)

(52) U.S. Cl.
CPC .............. *G06F 40/40* (2020.01); *G06F 40/20* (2020.01); *G06F 40/30* (2020.01)

(58) Field of Classification Search
CPC .......... G06F 40/00; G06F 40/20; G06F 40/30; G06F 40/40
See application file for complete search history.

(56) References Cited

U.S. PATENT DOCUMENTS

| 2020/0175987 A1* | 6/2020 | Thomson ................ G10L 15/26 |
| 2021/0240761 A1* | 8/2021 | Wang .................... G06F 40/216 |

(Continued)

FOREIGN PATENT DOCUMENTS

CN   112241626 A   *   1/2021   ........... G06F 40/194

OTHER PUBLICATIONS

European Patent Application No. 21187782.4, Search and Opinion dated Jan. 14, 2022, 8 pages.

(Continued)

*Primary Examiner* — Daniel C Washburn
*Assistant Examiner* — Sean E Serraguard
(74) *Attorney, Agent, or Firm* — Cozen O'Connor (57) ABSTRACT

A method for determining text similarity, a storage medium and an electronic device. The method includes: obtaining a first coding sequence corresponding to the first text and a second coding sequence corresponding to the second text; obtaining a first fusion feature corresponding to the first coding sequence and a second fusion feature corresponding to the second coding sequence based on the first coding sequence and the second coding sequence; converting the first fusion feature and the second fusion feature into a corresponding first semantic feature and a second semantic feature for representing semantics, and determining a text similarity between the first text and the second text based on the first semantic feature and the second semantic feature.

17 Claims, 7 Drawing Sheets

(56) References Cited

U.S. PATENT DOCUMENTS

2021/0286835 A1* 9/2021 Wang .................... G06F 40/284
2022/0237182 A1* 7/2022 Silavong ............... G06F 16/334

OTHER PUBLICATIONS

Hatzivassiloglou, V. et al. "Detecting Text Similarity over Short Passages: Exploring Linguistic Feature Combinations via Machine Learning" Jan. 1999 Joint SIGDAT Conference on Empirical Methods in Natural Language Processing and Very Large Corpora; 10 pages.

* cited by examiner

METHOD FOR DETERMINING TEXT SIMILARITY, STORAGE MEDIUM AND ELECTRONIC DEVICE

CROSS-REFERENCE TO RELATED APPLICATION

The present application is based upon and claims priority to Chinese Patent Application No. 202110258338.7, filed on Mar. 9, 2021, the entire contents of which are incorporated herein by reference.

TECHNICAL FIELD

The disclosure relates to the field of computer technologies, and more particularly, to a method for determining text similarity, a storage medium and an electronic device.

BACKGROUND

Existing text similarity calculation modes are widely applied in various business scenarios, such as intelligent customer service, document classification and clustering, and document duplicate checking. Generally, in the related art, similarity of a set of texts is determined based on a repetition degree of characters in the set of texts.

SUMMARY

To overcome the problems in the related art, embodiments of this disclosure provide a method for determining text similarity, a system for determining text similarity, a storage medium and an electronic device.

Embodiments of the disclosure provide a method for determining text similarity. The method includes: obtaining a first text and a second text required for text similarity calculation; determining a character string feature between the first text and the second text; converting the first text and the second text into vector codes respectively, to obtain a first coding sequence corresponding to the first text and a second coding sequence corresponding to the second text; obtaining a first fusion feature corresponding to the first coding sequence and a second fusion feature corresponding to the second coding sequence based on the first coding sequence and the second coding sequence; obtaining a first semantic feature of the first text based on the character string feature, the first coding sequence and the first fusion feature; obtaining a second semantic feature of the second text based on the character string feature, the second coding sequence and the second fusion feature; and determining a text similarity between the first text and the second text based on the first semantic feature and the second semantic feature.

Embodiments of the disclosure provide an electronic device. The electronic device includes: a processor and a memory for storing instructions executable by the processor. The processor is configured to: obtain a first text and a second text required for text similarity calculation; determine a character string feature between the first text and the second text; convert the first text and the second text into vector codes respectively, to obtain a first coding sequence corresponding to the first text and a second coding sequence corresponding to the second text; obtain a first fusion feature corresponding to the first coding sequence and a second fusion feature corresponding to the second coding sequence based on the first coding sequence and the second coding sequence; obtain a first semantic feature of the first text based on the character string feature, the first coding sequence and the first fusion feature; obtain a second semantic feature of the second text based on the character string feature, the second coding sequence and the second fusion feature; and determine a text similarity between the first text and the second text based on the first semantic feature and the second semantic feature.

Embodiments of the disclosure provide a computer-readable storage medium having computer program instructions stored thereon, when the program instructions are executed by a processor, the processor is caused to implement a method for determining text similarity, and the method includes: obtaining a first text and a second text required for text similarity calculation; determining a character string feature between the first text and the second text; converting the first text and the second text into vector codes respectively, to obtain a first coding sequence corresponding to the first text and a second coding sequence corresponding to the second text; obtaining a first fusion feature corresponding to the first coding sequence and a second fusion feature corresponding to the second coding sequence based on the first coding sequence and the second coding sequence; obtaining a first semantic feature of the first text based on the character string feature, the first coding sequence and the first fusion feature; obtaining a second semantic feature of the second text based on the character string feature, the second coding sequence and the second fusion feature; and determining a text similarity between the first text and the second text based on the first semantic feature and the second semantic feature.

It should be understood that the above general description and the following detailed description are only exemplary and explanatory, and cannot limit the disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In related arts, according to similarity algorithm, semantic information of the set of texts is not considered. When ideograms of texts from the set of texts are the same but the characters are different, good recognition effect may not be achieved by using this similarity algorithm based on the repetition degree.

The technical solution provided by the embodiments of the disclosure may include the following beneficial effects. The first semantic feature of the first text is determined based on the character string feature, the first coding sequence and the first fusion feature, and the second semantic feature of the second text is determined based on the character string feature, the second coding sequence and the second fusion feature. The text similarity between the first text and the second text is determined based on the first semantic feature and the second semantic feature. The character string feature between the first text and the second text, the first semantic feature and the second semantic feature are comprehensively considered to calculate the text similarity, so that the calculated text similarity is more accurate.

Figure 1:
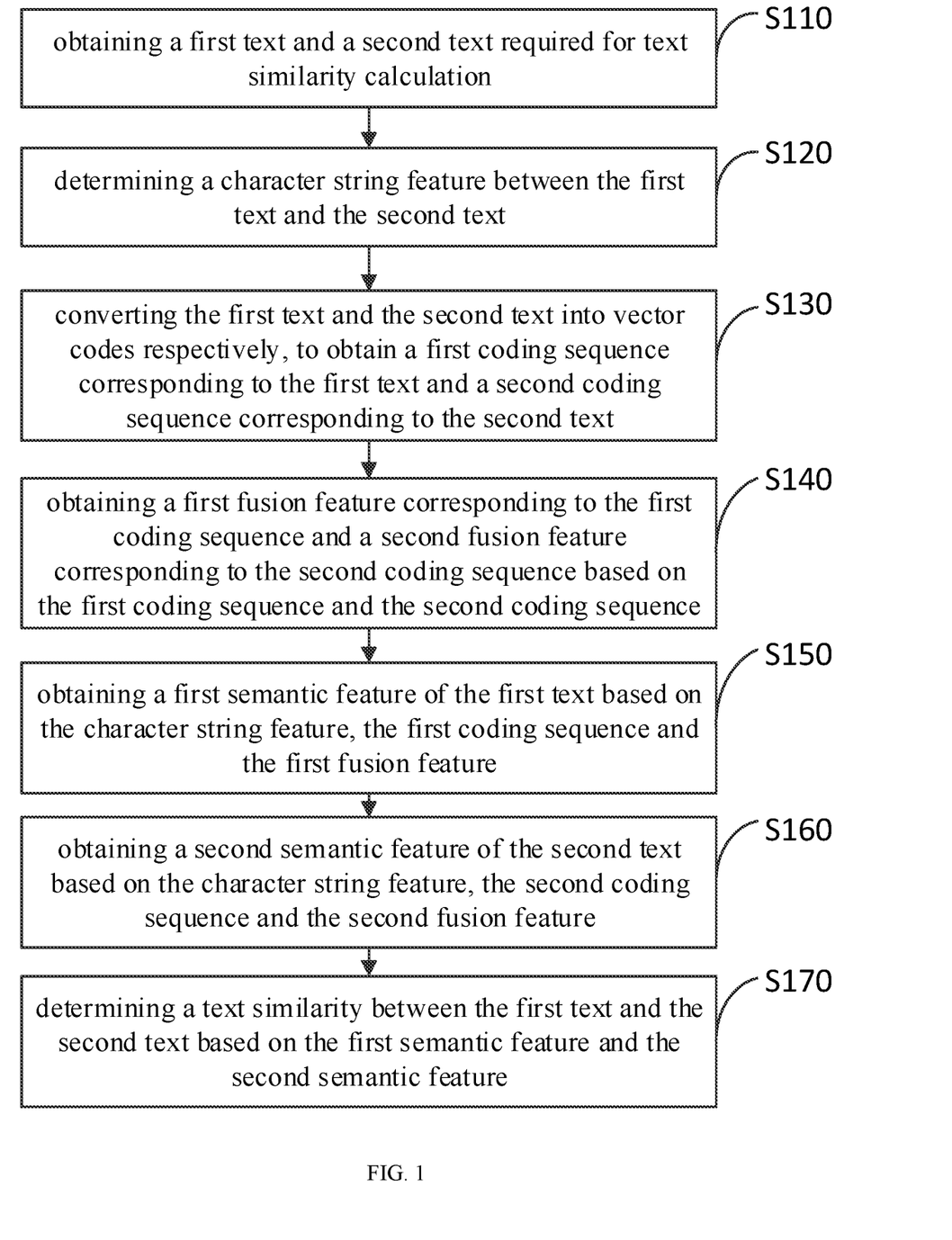
FIG. 1 is a flowchart of a method for determining text similarity according to an exemplary embodiment.

FIG. 1 is a flowchart of a method for determining text similarity according to an exemplary embodiment. As illustrated in FIG. 1, the method for determining text similarity is applied to the electronic device. The method includes the following steps.

At step S110, a first text and a second text required for text similarity calculation are obtained.

The first text and the second text may be any set of texts that need to be calculated for text similarity. For example, in an intelligent question answering application, the input text and any text in a knowledge base are calculated for text similarity.

At step S120, a character string feature between the first text and the second text is determined.

The character string feature may reflect a similarity of characters in the first text and the second text, and the character string feature may include at least one of word frequency-inverse text frequency, edit distance, Manhattan distance and Jaccard similarity coefficient.

Term Frequency-Inverse Document Frequency (TF-IDF) is configured to evaluate an importance of a word to a document set or a document in a corpus. The importance of a word increases in proportion to a number of times the word appears in the document, but at the same time the importance decreases in inverse proportion to the frequency of appearance of the word in the corpus. Term frequency (TF) refers to a number of times the word appears in the document. Inverse document frequency (IDF) means that if there are fewer documents containing a term t, the greater the IDF, indicating the term t has a good ability to distinguish categories.

Minimum Edit Distance (MED) refers to a minimum number of editing operations required to convert the first text to the second text.

Manhattan distance is generally a total absolute wheelbase of two points in the standard coordinate system. The similarity may be obtained by score=1/(euclideanDistance+1), where score is the similarity and euclideanDistance is the Manhattan distance.

Jaccard similarity coefficient refers to a ratio of an intersection of the first text and the second text to a collection of the first text and the second text, that is, Jaccard similarity coefficient is obtained by dividing words shared by the first text and the second text by all words in the first text and the second text.

It is worth noting that the calculation methods of word frequency-inverse text frequency, edit distance, Manhattan distance, and Jaccard similarity coefficient are existing technologies, which is not limited here.

It should be understood that although the character string feature of the disclosure includes at least one of word frequency-inverse text frequency, edit distance, Manhattan distance, and Jaccard similarity coefficient. In practical applications, the character string feature may also include other features that can be used to express the character similarity between the first text and the second text, such as, Hamming distance, Euclidean distance and cosine similarity.

At step S130, the first text and the second text are converted into vector codes respectively, to obtain a first coding sequence corresponding to the first text and a second coding sequence corresponding to the second text.

Vector codes are obtained by converting the words in the first text and the second text into vectors. The neural network model may be used to convert the words in the first text and the second text into vectors.

At step S140, a first fusion feature corresponding to the first coding sequence and a second fusion feature corresponding to the second coding sequence are obtained based on the first coding sequence and the second coding sequence.

The first fusion feature refers to fusing the second text in the first text, so that the first text is interacted with the second text, and the features of the first text and the second text are fused. The second fusion feature refers to fusing the first text in the second text, so that the second text may interact with the first text, and the features of the second text and the first text are obtained.

The first coding sequence and the second coding sequence are multiplied by the corresponding elements of the matrix to obtain the alignment matrix, and then an attention mechanism is used on the alignment matrix to make the first text and the second text are weighted to obtain the first fusion feature and the second fusion feature.

At step S150, a first semantic feature of the first text is obtained based on the character string feature, the first coding sequence and the first fusion feature.

The character string feature, the first coding sequence and the first fusion feature are directly spliced to obtain the first semantic feature. The first semantic feature may also be obtained by splicing the first coding sequence, the first fusion feature, the difference between the first coding sequence and the first fusion feature, the dot product of the first coding sequence and the first fusion feature, and the character string feature. The first semantic feature is feature information that represents semantic representation of the first text.

At step S160, a second semantic feature of the second text is obtained based on the character string feature, the second coding sequence and the second fusion feature.

The character string feature, the second coding sequence, and the second fusion feature are directly spliced to obtain the second semantic feature. The second semantic feature may also be obtained by splicing the second coding sequence, the second fusion feature, the difference between the second coding sequence and the second fusion feature, the dot product of the second coding sequence and the second fusion feature, and the character string feature. The second semantic feature is feature information that represents semantic representation of the second text.

At step S170, a text similarity between the first text and the second text is determined based on the first semantic feature and the second semantic feature.

After the first semantic feature and the second semantic feature are obtained, the text similarity between the first text and the second text is calculated based on the first semantic feature and the second semantic feature. In detail, the text similarity between the first text and the second text is calculated by calculating a Euclidean distance between the first semantic feature and the second semantic feature. The first semantic feature and the second semantic feature of the Sigmoid activation function are used for scoring to obtain the text similarity between the first text and the second text.

Thus, the first semantic feature used to comprehensively represent semantic representation of the first text is obtained based on the character string feature, the first encoding sequence and the first fusion feature. The second semantic feature used to comprehensively represent semantic representation of the second text is obtained based on the character string feature, the second encoding sequence and the second fusion feature. The text similarity between the first text and the second text is calculated based on the first semantic feature and the second semantic feature. The character string feature between the first text and the second text, and the semantic feature are comprehensively considered to calculate the text similarity, so that the calculated text similarity is more accurate.

Figure 2:
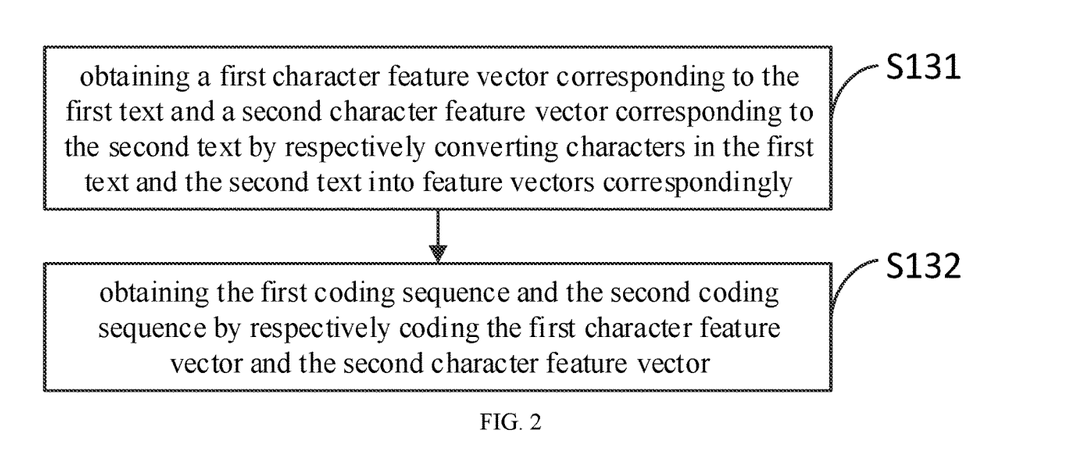
FIG. 2 is a flowchart of converting texts into vector codes according to an exemplary embodiment.

FIG. 2 is a flowchart of converting texts into vector codes according to an exemplary embodiment. At step S130, the first text and the second text are converted into vector codes respectively, to obtain a first coding sequence corresponding to the first text and a second coding sequence corresponding to the second text. Step S130 includes the following steps.

At step S131, a first character feature vector corresponding to the first text and a second character feature vector corresponding to the second text are obtained by respectively converting characters in the first text and the second text into feature vectors correspondingly.

The character feature vector refers to conversion of the characters of the first text and the second text into low-dimensional dense feature representations. The characters in the first text and the characters in the second text are converted into corresponding character feature vectors through an embedding layer in the neural network model. The embedding layer is initialized by using pre-trained word vectors and is constantly updated during a process of training the neural network. The embedding layer receives the characters in the first text and the second text, and converts the corresponding characters into corresponding low-dimensional dense feature representations. Word embedding through the embedding layer makes each character have a corresponding feature vector, and a distance between the feature vectors of similar words is close.

At step S132, the first coding sequence and the second coding sequence are obtained by respectively coding the first character feature vector and the second character feature vector.

The first coding sequence refers to a coding sequence that incorporates context features of the first text, and the second coding sequence refers to a coding sequence that incorporates context features of the second text. The first character feature vector and the second character feature vector output by the embedding layer may be used as input of a context coding layer, which may adopt a Bi-directional Long Short-Term Memory (BiLSTM) to respectively code the first character feature vector and the second character feature vector, to obtain the first coding sequence and the second coding sequence. BiLSTM includes a forward LSTM and a backward LSTM for modeling context information.

Thus, by respectively coding the first character feature vector and the second character feature vector, it is possible to obtain the first coding sequence combining with the context information of the first text and the second coding sequence combining with the context information of the second text, so that in the text similarity calculation process, the context information of the text is considered, and a text similarity calculation result is improved.

In some embodiments, at step S140, obtaining the first fusion feature corresponding to the first coding sequence and the second fusion feature corresponding to the second coding sequence based on the first coding sequence and the second coding sequence includes:

obtaining an alignment matrix by multiplying elements in the first coding sequence and the second coding sequence;

obtaining the first fusion feature in combination with a first preset calculation formula based on the alignment matrix, the first preset calculation formula being:

$$\tilde{a}_i = \sum_{j=1}^{l_b} \frac{\exp(e_{ij})}{\sum_{k=1}^{l_b}\exp(e_{ik})} \bar{b}_j,$$

where $\tilde{a}_i$ is the $i^{th}$ element in the first fusion feature, $l_b$ is a length of the second coding sequence, $e_{ij}$ is an element in the $i^{th}$ row and $j^{th}$ column in the alignment matrix, $e_{ik}$ is an element in the $i^{th}$ row and the $k^{th}$ column in the alignment matrix, and $\bar{b}_j$ is the $j^{th}$ element in the second coding sequence; and obtaining the second fusion feature in combination with a second preset calculation formula based on the alignment matrix, the second preset calculation formula being:

$$\tilde{b}_i = \sum_{j=1}^{l_a} \frac{\exp(e_{ij})}{\sum_{k=1}^{l_a}\exp(e_{kj})} \bar{a}_i,$$

where $\tilde{b}_i$ is the $i^{th}$ element in the second fusion feature, $l_a$ is a length of the first coding sequence, $e_{ij}$ is an element in the $i^{th}$ row and $j^{th}$ column in the alignment matrix, $e_{kj}$ is an element in the $k^{th}$ row and the $j^{th}$ column in the alignment matrix, and $\bar{a}_i$ is the $i^{th}$ element in the first coding sequence.

The first coding sequence and the second coding sequence are multiplied by corresponding elements of the matrix to obtain the alignment matrix. The elements in the alignment matrix are represented as:

$$e_{ij} = \bar{a}_i^T \cdot \bar{b}_j$$

where $e_{ij}$ is an element in the $i^{th}$ row and $j^{th}$ column in the alignment matrix, $\bar{a}_i$ is the $i^{th}$ element in the first coding sequence, $\bar{b}_j$ is the $j^{th}$ element in the second coding sequence, and T represents transposition of the matrix.

After the alignment matrix is obtained, an attention mechanism is used on the alignment matrix to weight the first text and the second text, so that the first text and the second text are interacted, and the features between the first text and the second text are fused. The attention mechanism is to use the first preset calculation formula and the second preset calculation formula to perform feature fusion on the first text and the second text.

Figure 3:
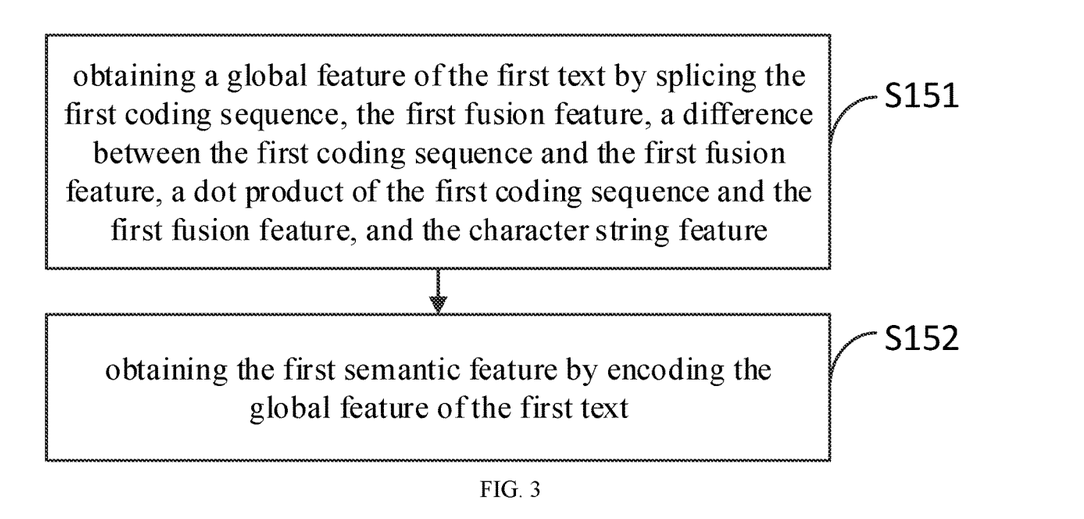
FIG. 3 is a flowchart of calculating a first semantic feature according to an exemplary embodiment.

FIG. 3 is a flowchart of calculating a first semantic feature according to an exemplary embodiment. As illustrated in FIG. 3, in some embodiments, step S150, obtaining the first semantic feature of the first text based on the character string feature, the first coding sequence and the first fusion feature, includes the following steps.

At step S151, a global feature of the first text is obtained by splicing the first coding sequence, the first fusion feature, a difference between the first coding sequence and the first fusion feature, a dot product of the first coding sequence and the first fusion feature, and the character string feature.

The first coding sequence, the first fusion feature, and the character string feature are summarized and recoded through a fusion reasoning layer of the neural network model. Before inputting the character string feature to the fusion reasoning layer, the character string feature is output to a fully connected layer for feature space transformation, so that the character string feature and the first fusion feature are in the same feature space. The fusion reasoning layer splices the first coding sequence, the first fusion feature, the difference between the first coding sequence and the first fusion feature, the dot product of the first coding sequence and the first fusion feature, and the character string feature, to obtain the global feature of the first text.

At step S152, the first semantic feature is obtained by encoding the global feature of the first text.

After obtaining the global feature of the first text, the fusion reasoning layer performs mixed coding on the global feature of the first text through BiLSTM to obtain the first semantic feature. The first semantic feature refers to the semantic representation of the first text.

Thus, by performing mixed coding of the first coding sequence, the first fusion feature, and the character string feature, the first semantic feature representing the global feature of the first text is obtained.

Figure 4:
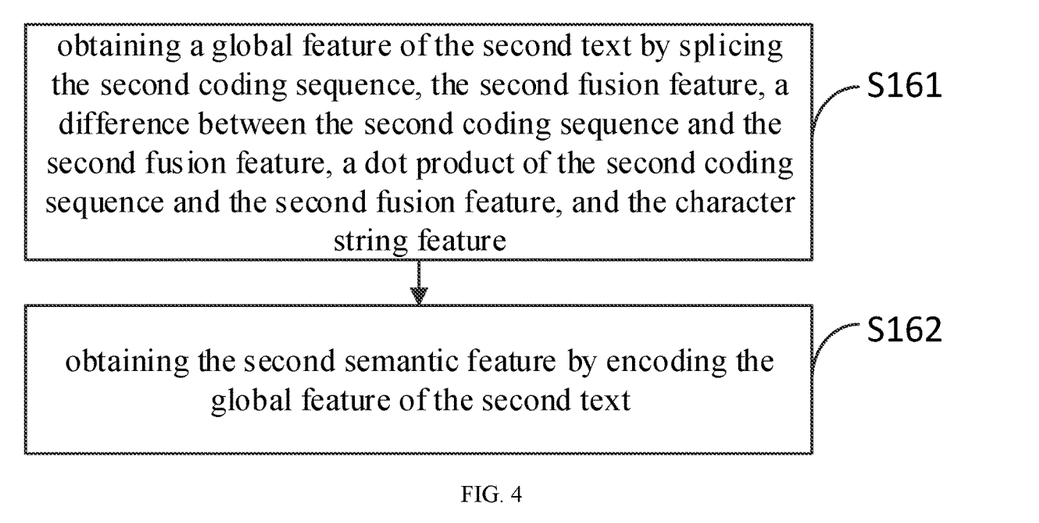
FIG. 4 is a flowchart of calculating a second semantic feature according to an exemplary embodiment.

FIG. 4 is a flowchart of calculating a second semantic feature according to an exemplary embodiment. As illustrated in FIG. 4, in some embodiments, step S160, obtaining the second semantic feature of the second text based on the character string feature, the second coding sequence and the second fusion feature, includes the following steps.

At step S161, a global feature of the second text is obtained by splicing the second coding sequence, the second fusion feature, a difference between the second coding sequence and the second fusion feature, a dot product of the second coding sequence and the second fusion feature, and the character string feature.

The second coding sequence, the second fusion feature, and the character string feature are summarized and recoded through the fusion reasoning layer of the neural network model. Before inputting the character string feature to the fusion reasoning layer, the character string feature is output to the fully connected layer for feature space transformation, so that the character string feature and the second fusion feature are in the same feature space. The fusion reasoning layer splices the first coding sequence, the second fusion feature, the difference between the second coding sequence and the second fusion feature, the dot product of the second coding sequence and the second fusion feature, and the character string feature, to obtain the global feature of the second text.

At step S162, the second semantic feature is obtained by encoding the global feature of the second text.

After obtaining the global feature of the second text, the fusion reasoning layer performs mixed coding on the global feature of the second text through BiLSTM to obtain the second semantic feature. The second semantic feature refers to the semantic representation of the second text.

Thus, by performing mixed coding of the second coding sequence, the second fusion feature, and the character string feature, the second semantic feature representing the global feature of the second text is obtained.

It should be understood that the first semantic feature and the second semantic feature are obtained through the same fusion reasoning layer.

Figure 5:
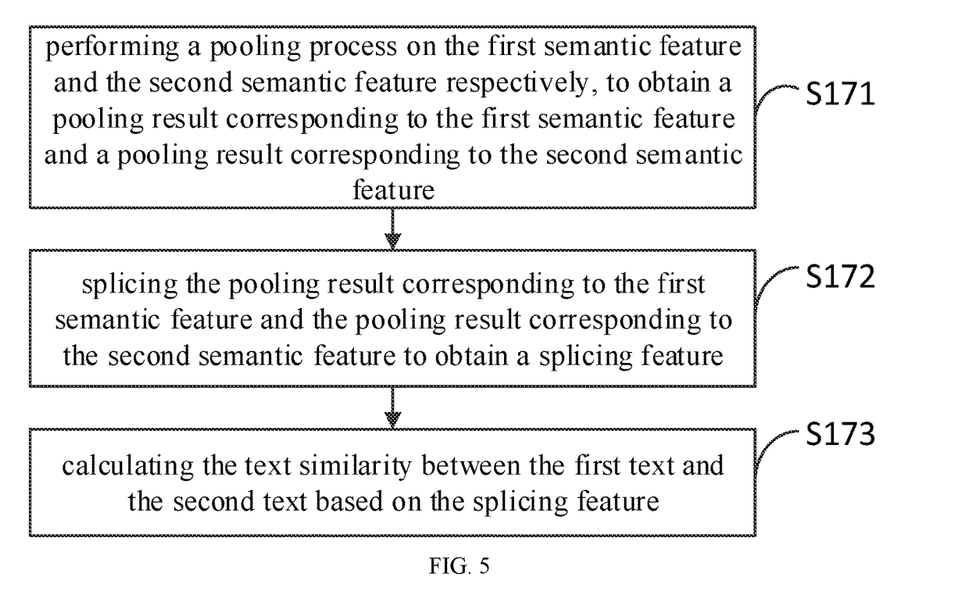
FIG. 5 is a flowchart of calculating text similarity according to an exemplary embodiment.

FIG. 5 is a flowchart of calculating text similarity according to an exemplary embodiment. As illustrated in FIG. 5, in some embodiments, at step S170, determining the text similarity between the first text and the second text based on the first semantic feature and the second semantic feature, includes the following steps.

At step S171, a pooling process is performed on the first semantic feature and the second semantic feature respectively, to obtain a pooling result corresponding to the first semantic feature and a pooling result corresponding to the second semantic feature.

The first semantic feature and the second semantic feature are respectively used as the input of the pooling layer, and the pooling layer respectively performs average pooling and maximum pooling on the first semantic feature and the second semantic feature to obtain the corresponding pooling result. Through pooling processing, the first semantic feature and the second semantic feature are filtered to remove redundant information.

At step S172, the pooling result corresponding to the first semantic feature and the pooling result corresponding to the second semantic feature are spliced to obtain a splicing feature.

The output result of the pooling layer includes the pooling result corresponding to the first semantic feature and the pooling result corresponding to the second semantic feature, and the pooling result of the first text is spliced with the pooling result of the second text to obtain the splicing feature.

At step S173, the text similarity between the first text and the second text is calculated based on the splicing feature.

After the splicing feature is obtained, the Sigmoid activation function may be used to score the splicing feature to obtain the text similarity between the first text and the second text. For example, the score includes [0, 1], and the higher the score, the greater the text similarity between the first text and the second text.

Hereinafter, the above embodiments are described in detail with reference to FIG. 6.

Figure 6:
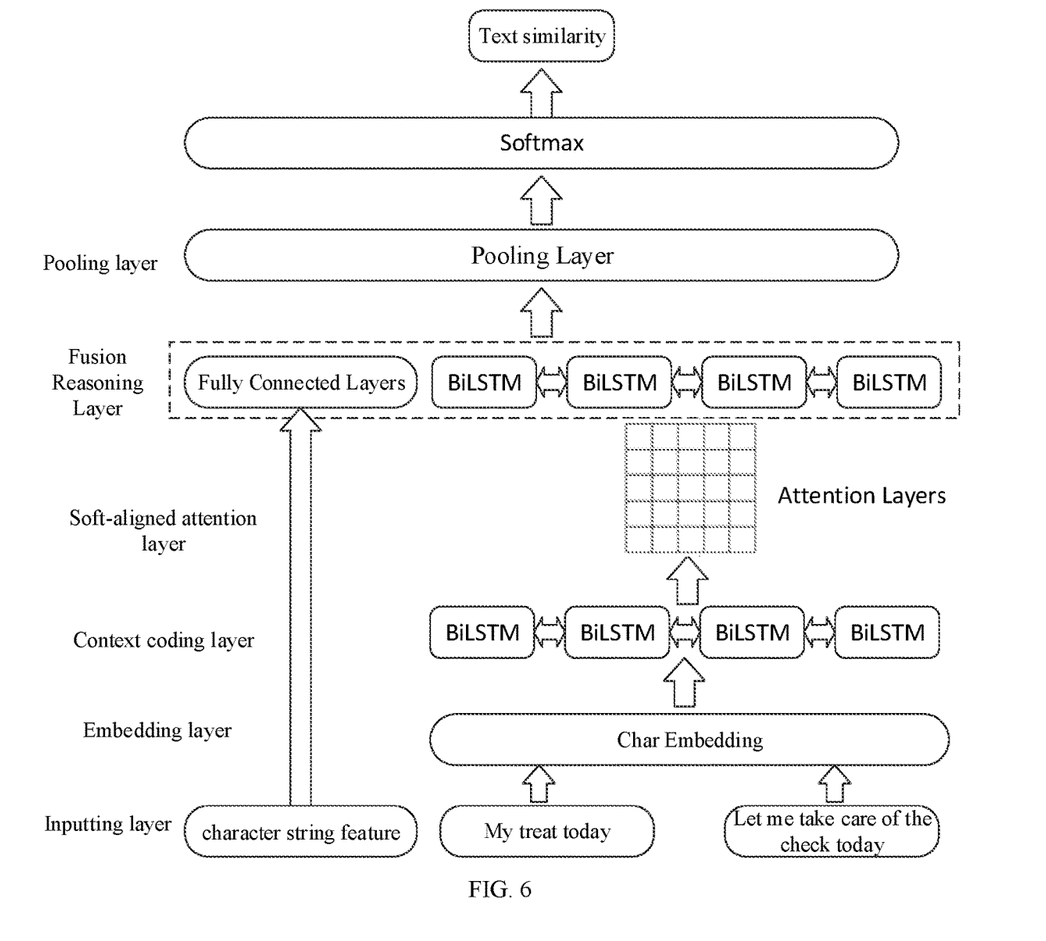
FIG. 6 is a schematic diagram of a method for determining text similarity according to an exemplary embodiment.

FIG. 6 is a schematic diagram of a method for determining text similarity according to an exemplary embodiment. As illustrated in FIG. 6, the text similarity calculation is performed through the neural network model, where the neural network model includes an input layer, an embedding layer, a context encoding layer, an encoding layer, a soft-aligned attention layer, a pooling layer and Softmax, which are sequentially connected.

The input layer includes two input features, the character string feature, and the text feature of the first text and the second text. The character string feature may be normalized before being sent to the input layer to remove the influence of dimensions between the feature data and ensure that each feature is at the same magnitude, which is helpful to the stability of the model. In detail, the following calculation formula is used for normalization processing:

$$\bar{x}_i = \frac{x_i - x_{min}}{x_{max} - x_{min}}$$

where $\bar{x}_i$ is a normalized result of the $i^{th}$ character string feature, $x_i$ is the $i^{th}$ character string feature, $x_{max}$ is the maximum value, and $x_{min}$ is the minimum value.

Before the text features are sent to the input layer, the first text and the second text are converted into corresponding text ID sequences through a predefined vocabulary. For example, the first text is "my treat today", and the second text is "let me take care of the check today", before sending to the input layer, the two texts are converted to the corresponding text ID sequences.

The embedding layer (Char Embedding) receives the text ID sequences input by the inputting layer, and converts the characters in the first text and the second text into corresponding feature vectors through the pre-trained word vectors, to obtain the character feature vector corresponding to the first text and the character feature vector corresponding to the second text.

The context coding layer receives the output result of the embedding layer, and uses BiLSTM to encode the character feature vector corresponding to the first text and the character feature vector corresponding to the second text to obtain the first coding sequence and the second coding sequence.

The soft-aligned attention layer receives the output result of the context coding layer, and the elements in the first coding sequence and the second coding sequence are multiplied after BiLSTM coding to obtain the alignment matrix. Then the attention mechanism is used on the alignment matrix to weight the first text and the second text to obtain the first semantic feature of the first text and the second semantic feature of the second text. The attention mechanism may be implemented by the attention layer.

The fusion reasoning layer summarizes the character string feature, the first coding sequence, the second coding sequence, the first fusion feature and the second fusion feature, and the first coding sequence, the first fusion feature, and the difference between the first coding sequence and the first fusion feature, the dot product of the first coding sequence and the first fusion feature, and the character string feature to obtain the global feature of the first text. BiLSTM is used to re-encode the global feature of the first text to obtain the first semantic feature. The second coding sequence, the second fusion feature, the difference between the second coding sequence and the second fusion feature, the dot product of the second coding sequence and the second fusion feature, and the character string feature are spliced to obtain the global feature of the second text, and then the global feature of the second text is re-encoded using the BiLSTM to obtain the second semantic feature.

The character string features are input from the input layer and processed by the fully connected layers as data in the same feature space as the first fusion feature.

The pooling layer receives the output result of the fusion reasoning layer, and performs average pooling and maximum pooling on the first semantic feature and the second semantic feature to obtain the pooling result of the first semantic feature and the pooling result of the second semantic feature, and the pooling result of the first semantic feature and the pooling result of the second semantic feature are spliced to obtain the splicing feature.

Softmax receives the splicing features output by the pooling layer, and the Sigmoid activation function is used to score the splicing features to obtain the text similarity between the first text and the second text.

It is worth noting that the inventors use the public data set to train the above neural network model, and use a test set to verify the neural network model. The accuracy rate of the neural network model reaches 80.87%, a recall rate is 93.45%, and a F1 score (F1-score) is 86.7%. Therefore, the method for determining text similarity provided by the disclosure has high recognition accuracy in practical applications.

Figure 7:
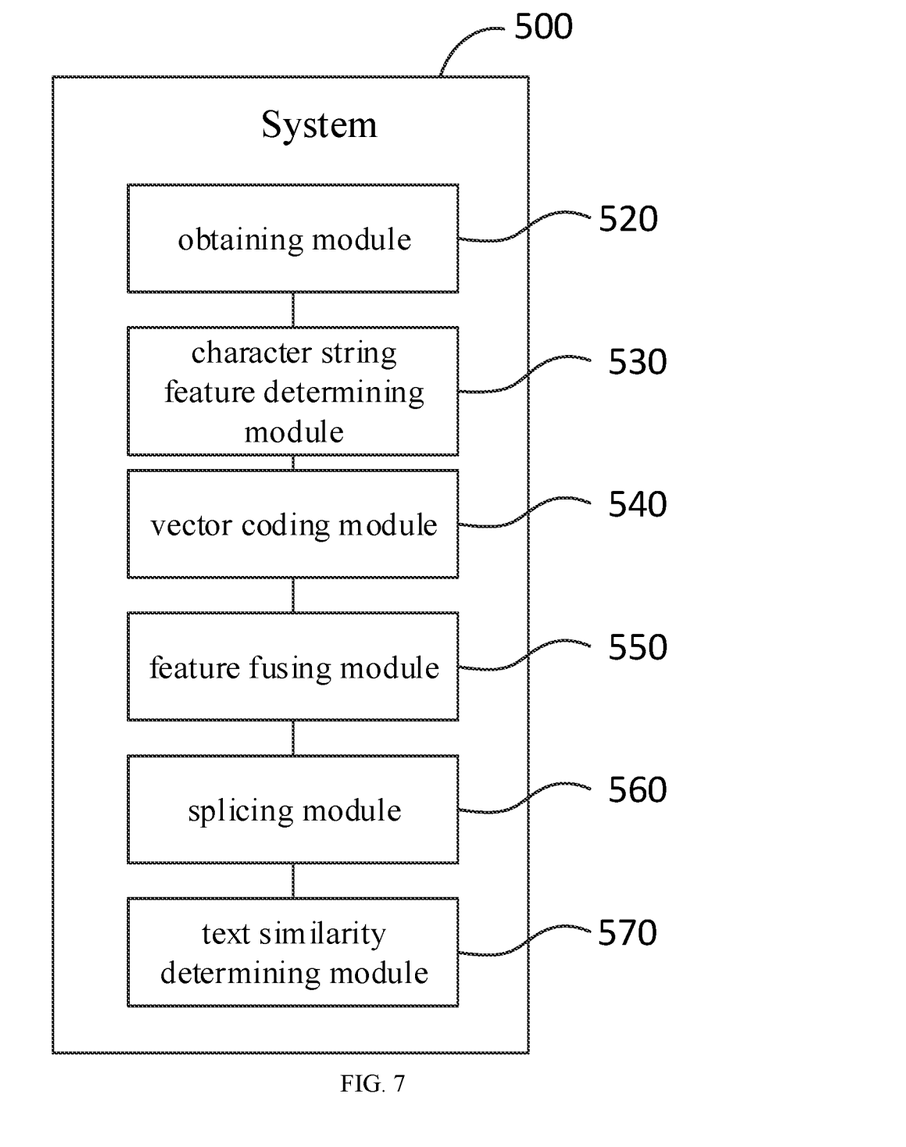
FIG. 7 is a block diagram of a system for determining text similarity according to an exemplary embodiment.

FIG. 7 is a block diagram of a system for determining text similarity according to an exemplary embodiment. As illustrated in FIG. 7, the system 500 includes: an obtaining module 520, a character string feature determining module 530, a vector coding module 540, a feature fusing module 550, a splicing module 560 and a text similarity determining module 570.

The obtaining module 520 is configured to obtain a first text and a second text required for text similarity calculation.

The character string feature determining module 530 is configured to determine a character string feature between the first text and the second text.

The vector coding module 540 is configured to convert the first text and the second text into vector codes respectively, to obtain a first coding sequence corresponding to the first text and a second coding sequence corresponding to the second text.

The feature fusing module 550 is configured to obtain a first fusion feature corresponding to the first coding sequence and a second fusion feature corresponding to the second coding sequence based on the first coding sequence and the second coding sequence.

The splicing module 560 is configured to obtain a first semantic feature of the first text based on the character string feature, the first coding sequence and the first fusion feature, and to obtain a second semantic feature of the second text based on the character string feature, the second coding sequence and the second fusion feature.

The text similarity determining module 570 is configured to determine a text similarity between the first text and the second text based on the first semantic feature and the second semantic feature.

In some embodiments, the vector coding module 540 is further configured to obtain a first character feature vector corresponding to the first text and a second character feature vector corresponding to the second text by respectively converting characters in the first text and the second text into feature vectors correspondingly, and obtain the first coding sequence and the second coding sequence by respectively coding the first character feature vector and the second character feature vector.

In some embodiments, the feature fusing module 550 is further configured to obtain an alignment matrix by multiplying elements in the first coding sequence and the second coding sequence.

The first fusion feature is obtained in combination with a first preset calculation formula based on the alignment matrix, the first preset calculation formula being:

$$\tilde{a}_i = \sum_{j=1}^{l_b} \frac{\exp(e_{ij})}{\sum_{k=1}^{l_b} \exp(e_{ik})} \bar{b}_j,$$

where $\tilde{a}_i$ is the $i^{th}$ element in the first fusion feature, $l_b$ is a length of the second coding sequence, $e_{ij}$ is an element in the $i^{th}$ row and $j^{th}$ column in the alignment matrix, $e_{ik}$ is an element in the $i^{th}$ row and the $k^{th}$ column in the alignment matrix, and $\overline{b}_j$ is the $j^{th}$ element in the second coding sequence.

The second fusion feature is obtained in combination with a second preset calculation formula based on the alignment matrix, the second preset calculation formula being:

$$\tilde{b}_i = \sum_{j=1}^{l_a} \frac{\exp(e_{ij})}{\sum_{k=1}^{l_a}\exp(e_{kj})} \overline{a}_i,$$

where $\tilde{b}_i$ is the $i^{th}$ element in the second fusion feature, $l_a$ is a length of the first coding sequence, $e_{ij}$ is an element in the $i^{th}$ row and $j^{th}$ column in the alignment matrix, $e_{kj}$ is an element in the $k^{th}$ row and the $j^{th}$ column in the alignment matrix, and $\overline{a}_i$ is the $i^{th}$ element in the first coding sequence.

In some embodiments, the splicing module 560 is further configured to: obtain a global feature of the first text by splicing the first coding sequence, the first fusion feature, a difference between the first coding sequence and the first fusion feature, a dot product of the first coding sequence and the first fusion feature, and the character string feature, and obtain the first semantic feature by encoding the global feature of the first text.

In some embodiments, the splicing module 560 is further configured to: obtain a global feature of the second text by splicing the second coding sequence, the second fusion feature, a difference between the second coding sequence and the second fusion feature, a dot product of the second coding sequence and the second fusion feature, and the character string feature, and obtain the second semantic feature by encoding the global feature of the second text.

In some embodiments, the text similarity determining module 570 is further configured to: perform a pooling process on the first semantic feature and the second semantic feature respectively, to obtain a pooling result corresponding to the first semantic feature and a pooling result corresponding to the second semantic feature; splice the pooling result corresponding to the first semantic feature and the pooling result corresponding to the second semantic feature to obtain a splicing feature; and calculate the text similarity between the first text and the second text based on the splicing feature.

In some embodiments, the character string feature includes at least one of word frequency-inverse text frequency, edit distance, Manhattan distance and Jaccard similarity coefficient.

Regarding the system in the above embodiments, the specific manner of performing operations by each module has been described in detail in the method embodiments, and detailed description is not repeated here.

The disclosure also provides a computer-readable storage medium on which computer program instructions are stored. When the program instructions are executed by a processor, the method for determining text similarity provided in the disclosure is realized.

Figure 8:
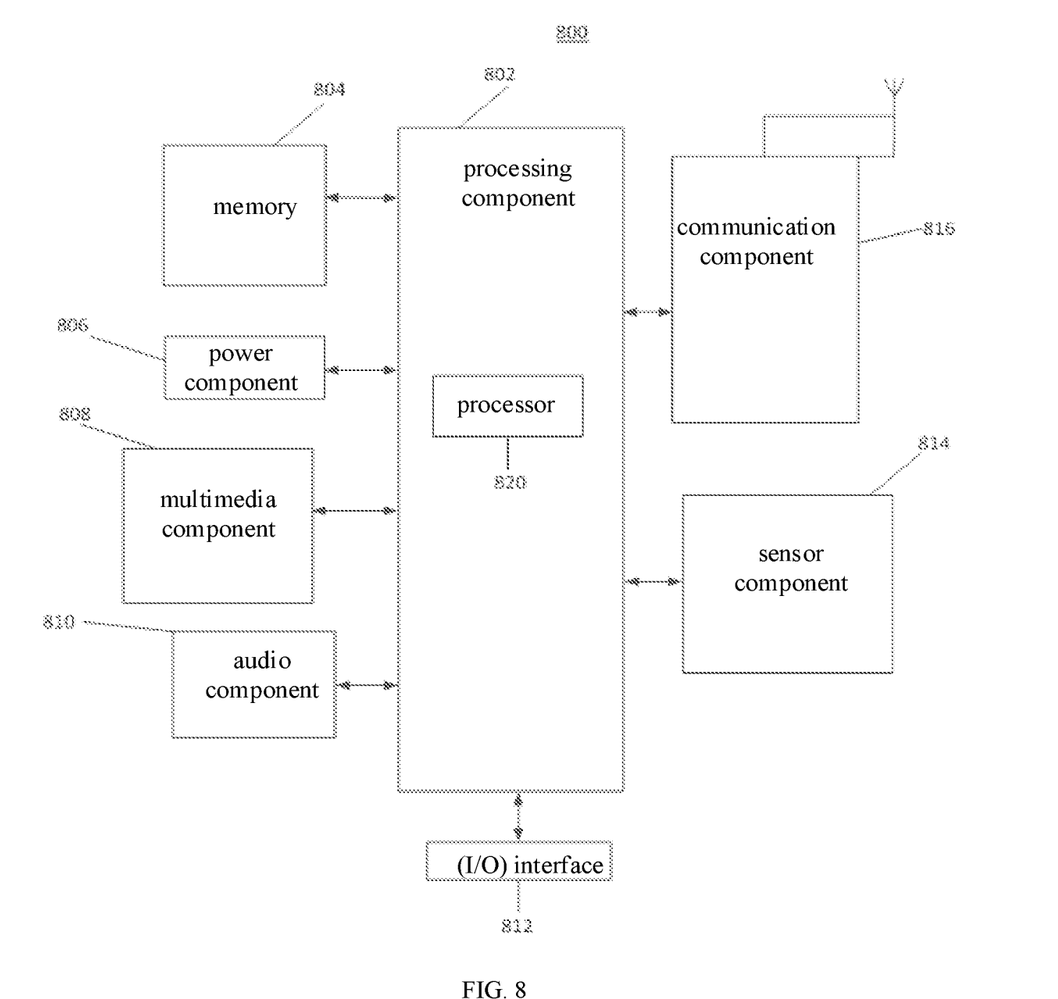
FIG. 8 is a block diagram of an electronic device 800 according to an exemplary embodiment.

FIG. 8 is a block diagram of an electronic device 800 according to an exemplary embodiment of the disclosure. For example, the electronic device 800 may be a mobile phone, a computer, a digital broadcasting terminal, a message transceiver device, a game console, a tablet device, a medical device, a fitness device and a personal digital assistant.

As illustrated in FIG. 8, the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the electronic device 800. Examples of such data include instructions for any applications or methods operated on the electronic device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the electronic device 800. The power component 806 may include a power management system, one or more power sources, and any other components associated with the generation, management, and distribution of power in the electronic device 800.

The multimedia component 808 includes a screen providing an output interface between the electronic device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the electronic device 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the electronic device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the electronic device 800. For instance, the sensor component 814 may detect an open/closed status of the electronic device 800, relative positioning of components, e.g., the display and the keypad, of the electronic device 800, a change in position of the electronic device 800 or a component of the electronic device 800, a presence or absence of user contact with the electronic device 800, an orientation or an acceleration/deceleration of the electronic device 800, and a change in temperature of the electronic device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the electronic device 800 and other devices. The electronic device 800 can access a wireless network based on a communication standard, such as WiFi, 2G, or 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the electronic device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 804, executable by the processor 820 in the electronic device 800, for performing the above method. For example, the non-transitory computer-readable storage medium may be a ROM, a RAM, a CD-ROM, a magnetic tape, a floppy disc, an optical data storage device, and the like.

In another exemplary embodiment, a computer program product is further provided. The computer program product includes a computer program that can be executed by a programmable device, and the computer program has a code portion for executing the above method for determining text similarity when executed by the programmable device.

Figure 9:
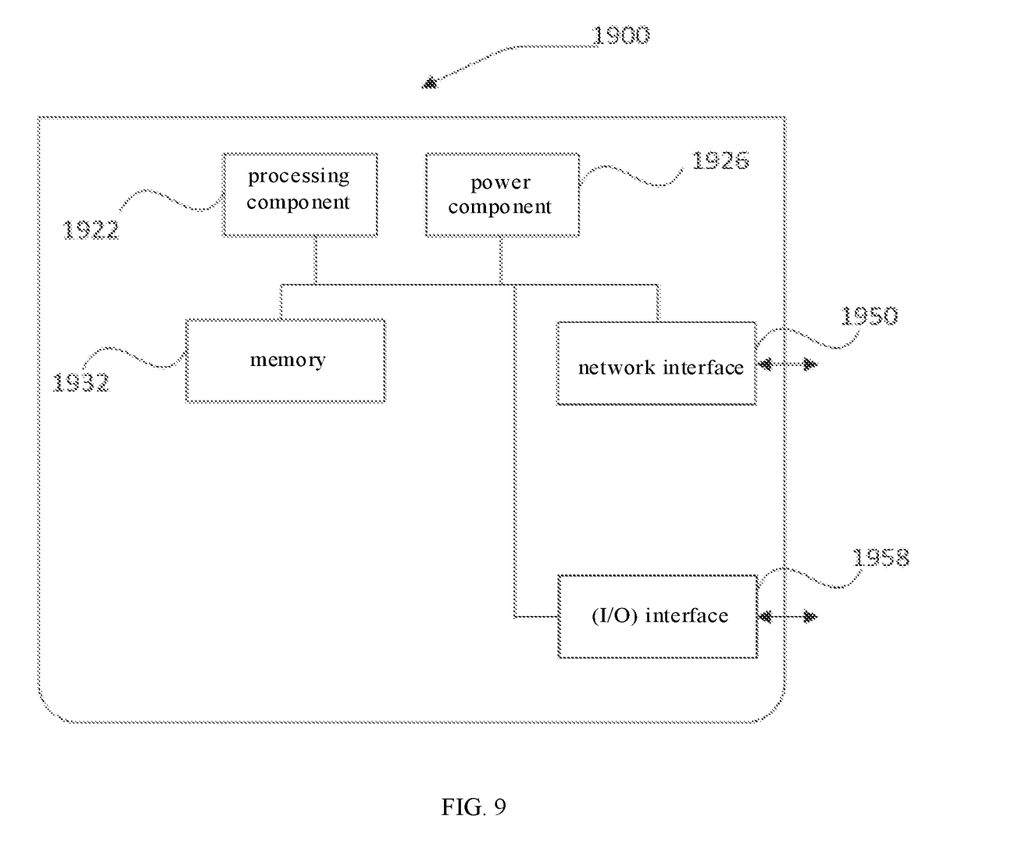
FIG. 9 is a block diagram of an electronic device 1900 according to an exemplary embodiment.

FIG. 9 is a block diagram of an electronic device 1900 according to an exemplary embodiment. For example, the electronic device 1900 may be provided as a server. As illustrated in FIG. 9, the electronic device 1900 includes a processing component 1922, which further includes one or more processors, and a memory resource represented by a memory 1932 for storing instructions executable by the processing component 1922, such as application programs. The application program stored in the memory 1932 may include one or more modules each corresponding to a set of instructions. In addition, the processing component 1922 is configured to execute instructions to execute the above method for determining text similarity.

The electronic device 1900 may also include a power component 1926 configured to perform power management of the electronic device 1900, a wired or wireless network interface 1950 configured to connect the electronic device 1900 to a network, and an input output (I/O) interface 1958. The electronic device 1900 operates based on an operating system stored in the memory 1932, such as Windows Server™, Mac OS X™, Unix™, Linux™, FreeBSD™ or the like.

Those skilled in the art easily think of other embodiments of the disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the claimed invention is limited only by the appended claims.

What is claimed is:

1. A method for determining text similarity, performed by an electronic device, comprising:
   obtaining a first text and a second text required for text similarity calculation;
   determining a character string feature between the first text and the second text, wherein the character string feature, text feature of the first text and the second text are inputted to an input layer of a neural network model;
   converting, by the neural network model, the first text and the second text into vector codes respectively, to obtain a first coding sequence corresponding to the first text and a second coding sequence corresponding to the second text;
   obtaining, by the neural network model, a first fusion feature corresponding to the first coding sequence and a second fusion feature corresponding to the second coding sequence based on the first coding sequence and the second coding sequence;
   obtaining, by the neural network model, a first semantic feature of the first text based on the character string feature, the first coding sequence and the first fusion feature;
   obtaining, by the neural network model, a second semantic feature of the second text based on the character string feature, the second coding sequence and the second fusion feature; and determining, by the neural network model, a text similarity between the first text and the second text based on the first semantic feature and the second semantic feature;

wherein converting the first text and the second text into vector codes respectively, to obtain the first coding sequence corresponding to the first text and the second coding sequence corresponding to the second text comprises:

obtaining a first character feature vector corresponding to the first text and a second character feature vector corresponding to the second text by respectively converting characters in the first text and the second text into feature vectors correspondingly; and obtaining the first coding sequence and the second coding sequence by respectively coding the first character feature vector and the second character feature vector, wherein the first coding sequence is a coding sequence which is obtained by coding based on context features of the first text, and the second coding sequence is a coding sequence which is obtained by coding based on context features of the second text.

2. The method of claim 1, wherein obtaining the first fusion feature corresponding to the first coding sequence and the second fusion feature corresponding to the second coding sequence based on the first coding sequence and the second coding sequence, comprises:

obtaining an alignment matrix by multiplying elements in the first coding sequence and the second coding sequence;

obtaining the first fusion feature in combination with a first preset calculation formula based on the alignment matrix, the first preset calculation formula being:

$$\bar{a}_i = \sum_{j=1}^{l_b} \frac{\exp(e_{ij})}{\sum_{k=1}^{l_b} \exp(e_{ik})} \bar{b}_j,$$

where $\bar{a}_i$ is an $i^{th}$ element in the first fusion feature, $l_b$ is a length of the second coding sequence, $e_{ij}$ is an element in an $i^{th}$ row and a $j^{th}$ column in the alignment matrix, $e_{ik}$ is an element in the $i^{th}$ row and a $k^{th}$ column in the alignment matrix, and $\bar{b}_j$ is a $j^{th}$ element in the second coding sequence; and obtaining the second fusion feature in combination with a second preset calculation formula based on the alignment matrix, the second preset calculation formula being:

$$\bar{b}_i = \sum_{j=1}^{l_a} \frac{\exp(e_{ij})}{\sum_{k=1}^{l_a} \exp(e_{kj})} \bar{a}_i,$$

where $\bar{b}_i$ is an $i^{th}$ element in the second fusion feature, $l_a$ is a length of the first coding sequence, $e_{ij}$ is an element in the $i^{th}$ row and $j^{th}$ column in the alignment matrix, $e_{kj}$ is an element in a $k^{th}$ row and the $j^{th}$ column in the alignment matrix, and $\bar{a}_i$ is an $i^{th}$ element in the first coding sequence.

3. The method of claim 1, wherein obtaining the first semantic feature of the first text based on the character string feature, the first coding sequence and the first fusion feature, comprises:

obtaining a global feature of the first text by splicing the first coding sequence, the first fusion feature, a difference between the first coding sequence and the first fusion feature, a dot product of the first coding sequence and the first fusion feature, and the character string feature; and obtaining the first semantic feature by encoding the global feature of the first text.

4. The method of claim 1, wherein obtaining the second semantic feature of the second text based on the character string feature, the second coding sequence and the second fusion feature, comprises:

obtaining a global feature of the second text by splicing the second coding sequence, the second fusion feature, a difference between the second coding sequence and the second fusion feature, a dot product of the second coding sequence and the second fusion feature, and the character string feature; and obtaining the second semantic feature by encoding the global feature of the second text.

5. The method of claim 1, wherein determining the text similarity between the first text and the second text based on the first semantic feature and the second semantic feature, comprises:

performing a pooling process on the first semantic feature and the second semantic feature respectively, to obtain a pooling result corresponding to the first semantic feature and a pooling result corresponding to the second semantic feature;

splicing the pooling result corresponding to the first semantic feature and the pooling result corresponding to the second semantic feature to obtain a splicing feature; and calculating the text similarity between the first text and the second text based on the splicing feature.

6. The method of claim 1, wherein the character string feature comprises at least one of word frequency-inverse text frequency, edit distance, Manhattan distance and Jaccard similarity coefficient.

7. An electronic device, comprising:
a processor and a memory for storing instructions executable by the processor;
wherein the processor is configured to:
obtain a first text and a second text required for text similarity calculation;
determine a character string feature between the first text and the second text, wherein the character string feature, text feature of the first text and the second text are inputted to an input layer of a neural network model;
convert, by the neural network model, the first text and the second text into vector codes respectively, to obtain a first coding sequence corresponding to the first text and a second coding sequence corresponding to the second text;
obtain, by the neural network model, a first fusion feature corresponding to the first coding sequence and a second fusion feature corresponding to the second coding sequence based on the first coding sequence and the second coding sequence;
obtain, by the neural network model, a first semantic feature of the first text based on the character string feature, the first coding sequence and the first fusion feature, and to obtain a second semantic feature of the second text based on the character string feature, the second coding sequence and the second fusion feature; and determine, by the neural network model, a text similarity between the first text and the second text based on the first semantic feature and the second semantic feature;

wherein the processor is configured to:

obtain a first character feature vector corresponding to the first text and a second character feature vector corresponding to the second text by respectively converting characters in the first text and the second text into feature vectors correspondingly; and obtain the first coding sequence and the second coding sequence by respectively coding the first character feature vector and the second character feature vector, wherein the first coding sequence is a coding sequence which is obtained by coding based on context features of the first text, and the second coding sequence is a coding sequence which is obtained by coding based on context features of the second text.

8. The electronic device of claim 7, wherein the processor is configured to:

obtain an alignment matrix by multiplying elements in the first coding sequence and the second coding sequence;

obtain the first fusion feature in combination with a first preset calculation formula based on the alignment matrix, the first preset calculation formula being:

$$\bar{a}_i = \sum_{j=1}^{l_b} \frac{\exp(e_{ij})}{\sum_{k=1}^{l_b} \exp(e_{ik})} \bar{b}_j,$$

where $\bar{a}_i$ is an $i^{th}$ element in the first fusion feature, $l_b$ is a length of the second coding sequence, $e_{ij}$ is an element in an $i^{th}$ row and a $j^{th}$ column in the alignment matrix, $e_{ik}$ is an element in the $i^{th}$ row and a $k^{th}$ column in the alignment matrix, and $\bar{b}_j$ is a $j^{th}$ element in the second coding sequence; and obtain the second fusion feature in combination with a second preset calculation formula based on the alignment matrix, the second preset calculation formula being:

$$\bar{b}_i = \sum_{j=1}^{l_a} \frac{\exp(e_{ij})}{\sum_{k=1}^{l_a} \exp(e_{kj})} \bar{a}_i,$$

where $\bar{b}_i$ is an $i^{th}$ element in the second fusion feature, $l_a$ is a length of the first coding sequence, $e_{ij}$ is an element in the $i^{th}$ row and $j^{th}$ column in the alignment matrix, $e_{kj}$ is an element in a $k^{th}$ row and the $j^{th}$ column in the alignment matrix, and $\bar{a}_i$ is an $i^{th}$ element in the first coding sequence.

9. The electronic device of claim 7, wherein the processor is configured to:

obtain a global feature of the first text by splicing the first coding sequence, the first fusion feature, a difference between the first coding sequence and the first fusion feature, a dot product of the first coding sequence and the first fusion feature, and the character string feature; and obtain the first semantic feature by encoding the global feature of the first text.

10. The electronic device of claim 7, wherein the processor is configured to:

obtain a global feature of the second text by splicing the second coding sequence, the second fusion feature, a difference between the second coding sequence and the second fusion feature, a dot product of the second coding sequence and the second fusion feature, and the character string feature; and obtain the second semantic feature by encoding the global feature of the second text.

11. The electronic device of claim 7, wherein the processor is configured to:

perform a pooling process on the first semantic feature and the second semantic feature respectively, to obtain a pooling result corresponding to the first semantic feature and a pooling result corresponding to the second semantic feature;

splice the pooling result corresponding to the first semantic feature and the pooling result corresponding to the second semantic feature to obtain a splicing feature; and calculate the text similarity between the first text and the second text based on the splicing feature.

12. The electronic device of claim 7, wherein the character string feature comprises at least one of word frequency-inverse text frequency, edit distance, Manhattan distance and Jaccard similarity coefficient.

13. A non-transitory computer-readable storage medium having computer program instructions stored thereon, wherein when the program instructions are executed by a processor, the processor is caused to implement a method for determining text similarity, and the method comprises:

obtaining a first text and a second text required for text similarity calculation;

determining a character string feature between the first text and the second text, wherein the character string feature, text feature of the first text and the second text are inputted to an input layer of a neural network model;

converting, by the neural network model, the first text and the second text into vector codes respectively, to obtain a first coding sequence corresponding to the first text and a second coding sequence corresponding to the second text;

obtaining, by the neural network model, a first fusion feature corresponding to the first coding sequence and a second fusion feature corresponding to the second coding sequence based on the first coding sequence and the second coding sequence;

obtaining, by the neural network model, a first semantic feature of the first text based on the character string feature, the first coding sequence and the first fusion feature;

obtaining, by the neural network model, a second semantic feature of the second text based on the character string feature, the second coding sequence and the second fusion feature; and determining, by the neural network model, a text similarity between the first text and the second text based on the first semantic feature and the second semantic feature;

wherein converting the first text and the second text into vector codes respectively, to obtain the first coding sequence corresponding to the first text and the second coding sequence corresponding to the second text comprises:

obtaining a first character feature vector corresponding to the first text and a second character feature vector corresponding to the second text by respectively converting characters in the first text and the second text into feature vectors correspondingly; and obtaining the first coding sequence and the second coding sequence by respectively coding the first character feature vector and the second character feature vector, wherein the first coding sequence is a coding sequence which is obtained by coding based on context features of the first text, and the second coding sequence is a coding sequence which is obtained by coding based on context features of the second text.

14. The non-transitory computer-readable storage medium of claim 13, wherein obtaining the first fusion feature corresponding to the first coding sequence and the second fusion feature corresponding to the second coding sequence based on the first coding sequence and the second coding sequence, comprises:

obtaining an alignment matrix by multiplying elements in the first coding sequence and the second coding sequence;

obtaining the first fusion feature in combination with a first preset calculation formula based on the alignment matrix, the first preset calculation formula being:

$$\bar{a}_i = \sum_{j=1}^{l_b} \frac{\exp(e_{ij})}{\sum_{k=1}^{l_b} \exp(e_{ik})} \bar{b}_j,$$

where $\bar{a}_i$ is an $i^{th}$ element in the first fusion feature, $l_b$ is a length of the second coding sequence, $e_{ij}$ is an element in an $i^{th}$ row and a $j^{th}$ column in the alignment matrix, $e_{ik}$ is an element in the $i^{th}$ row and a $k^{th}$ column in the alignment matrix, and $\bar{b}_j$ is an $j^{th}$ element in the second coding sequence; and obtaining the second fusion feature in combination with a second preset calculation formula based on the alignment matrix, the second preset calculation formula being:

$$\bar{b}_i = \sum_{j=1}^{l_a} \frac{\exp(e_{ij})}{\sum_{k=1}^{l_a} \exp(e_{kj})} \bar{a}_i,$$

where $\bar{b}_i$ is an $i^{th}$ element in the second fusion feature, $l_a$ is a length of the first coding sequence, $e_{ij}$ is an element in the $i^{th}$ row and $j^{th}$ column in the alignment matrix, $e_{kj}$ is an element in a $k^{th}$ row and the $j^{th}$ column in the alignment matrix, and $\bar{a}_i$ is an $i^{th}$ element in the first coding sequence.

15. The non-transitory computer-readable storage medium of claim 13, wherein obtaining the first semantic feature of the first text based on the character string feature, the first coding sequence and the first fusion feature, comprises:

obtaining a global feature of the first text by splicing the first coding sequence, the first fusion feature, a difference between the first coding sequence and the first fusion feature, a dot product of the first coding sequence and the first fusion feature, and the character string feature; and obtaining the first semantic feature by encoding the global feature of the first text.

16. The non-transitory computer-readable storage medium of claim 13, wherein obtaining the second semantic feature of the second text based on the character string feature, the second coding sequence and the second fusion feature, comprises:

obtaining a global feature of the second text by splicing the second coding sequence, the second fusion feature, a difference between the second coding sequence and the second fusion feature, a dot product of the second coding sequence and the second fusion feature, and the character string feature; and obtaining the second semantic feature by encoding the global feature of the second text.

17. The non-transitory computer-readable storage medium of claim 13, wherein determining the text similarity between the first text and the second text based on the first semantic feature and the second semantic feature, comprises:

performing a pooling process on the first semantic feature and the second semantic feature respectively, to obtain a pooling result corresponding to the first semantic feature and a pooling result corresponding to the second semantic feature;

splicing the pooling result corresponding to the first semantic feature and the pooling result corresponding to the second semantic feature to obtain a splicing feature; and calculating the text similarity between the first text and the second text based on the splicing feature.

* * * * *